US012673478B2

(12) United States Patent
Atkinson et al.

(10) Patent No.: US 12,673,478 B2
(45) Date of Patent: Jul. 7, 2026

(54) MULTILAYER TEXTILE HAVING PRINTED LAYER

(71) Applicant: NIKE, Inc., Beaverton, OR (US)

(72) Inventors: Suzanne Atkinson, Portland, OR (US);
Heidi A. Vaughan, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 418 days.

(21) Appl. No.: 16/358,450

(22) Filed: Mar. 19, 2019

(65) Prior Publication Data

US 2019/0366675 A1     Dec. 5, 2019

Related U.S. Application Data

(60) Provisional application No. 62/678,352, filed on May 31, 2018.

(51) Int. Cl.
*B32B 5/26*      (2006.01)
*A41B 17/00*      (2006.01)
*B32B 5/02*      (2006.01)

(52) U.S. Cl.
CPC .............. *B32B 5/26* (2013.01); *A41B 17/00* (2013.01); *B32B 5/022* (2013.01); *B32B 5/024* (2013.01); *A41B 2500/20* (2013.01); *A41B 2500/30* (2013.01); *B32B 2262/0284* (2013.01); *B32B 2307/75* (2013.01); *B32B 2437/00* (2013.01)

(58) Field of Classification Search
CPC . B32B 5/022; B32B 5/024; B32B 2262/0284; B32B 2307/75; B32B 2437/00; B32B 3/04; B32B 3/06; B32B 5/02; B32B 5/06; B32B 7/05; B32B 7/06; B32B 7/08; B32B 7/09; B32B 7/12; B32B 5/275; B32B 5/262; B32B 5/265; B32B 5/26–277; B32B 2250/04; A41B 17/00; A41B 2500/20; A41B 2500/30; A41D 31/02
USPC ...................... 442/25–26, 268–285; 5/413 R
See application file for complete search history.

(56) References Cited

U.S. PATENT DOCUMENTS

| | | | |
|---|---|---|---|
| 3,191,257 A | | 6/1965 | Smith, II |
| 4,013,407 A | | 3/1977 | Ray, Jr. |
| 4,119,397 A | | 10/1978 | Synder |
| 4,129,675 A | | 12/1978 | Scott |
| 4,249,532 A | | 2/1981 | Polansky et al. |
| 4,569,874 A | | 2/1986 | Kuznetz |
| 5,199,121 A | * | 4/1993 | Payne .................. A47G 9/0207 |
| | | | 5/413 R |

(Continued)

FOREIGN PATENT DOCUMENTS

| | | |
|---|---|---|
| CA | 2256157 C | 2/2008 |
| CN | 1993233 A | 7/2007 |

(Continued)

OTHER PUBLICATIONS

English translation of JP 2000129512 A obtained by Global Dossier. (Year: 2001).*

(Continued)

*Primary Examiner* — Braelyn R Watson
(74) *Attorney, Agent, or Firm* — Shook, Hardy & Bacon L.L.P.

(57) ABSTRACT

Aspects herein are directed to a multilayer textile including at least a first and second layer. The second layer may include a sublimation-printed component that is visible through the first layer.

19 Claims, 5 Drawing Sheets

(56) References Cited

U.S. PATENT DOCUMENTS

| | | | |
|---|---|---|---|
| 5,494,734 A | 2/1996 | Widders | |
| 5,518,798 A | 5/1996 | Riedel | |
| 5,591,530 A | 1/1997 | Warner et al. | |
| 5,693,407 A | 12/1997 | Swanson, Jr. | |
| 5,827,787 A | 10/1998 | White | |
| 5,836,841 A | 11/1998 | Fell | |
| 6,045,900 A | 4/2000 | Haffner et al. | |
| 6,067,660 A * | 5/2000 | Contini | A41D 27/08 |
| | | | 428/101 |
| 6,112,328 A * | 9/2000 | Spector | A41D 13/0125 |
| | | | 2/69 |
| 6,506,467 B2 | 1/2003 | Grosskopf et al. | |
| 6,735,832 B1 | 5/2004 | Putnam et al. | |
| 6,735,833 B2 | 5/2004 | Putnam et al. | |
| 6,764,744 B2 | 7/2004 | DeMott et al. | |
| 6,809,045 B1 | 10/2004 | Alam et al. | |
| 6,818,282 B2 | 11/2004 | Hynicka et al. | |
| 6,822,024 B1 | 11/2004 | Spirkowyc et al. | |
| 6,837,078 B1 | 1/2005 | Rock et al. | |
| 6,967,052 B2 | 11/2005 | Zafiroglu | |
| 7,259,113 B2 | 8/2007 | Dufresne-Nappert et al. | |
| 7,361,403 B1 * | 4/2008 | Lowe | G09F 15/02 |
| | | | 442/64 |
| 7,378,130 B2 | 5/2008 | Coronado et al. | |
| 7,378,143 B2 | 5/2008 | Schneider et al. | |
| 7,659,217 B2 | 2/2010 | Narayanan et al. | |
| 8,959,959 B1 * | 2/2015 | Podhajny | A43B 23/0235 |
| | | | 36/47 |
| 9,011,971 B2 | 4/2015 | Shiao | |
| 9,018,434 B2 | 4/2015 | Ruman et al. | |
| 9,121,133 B2 | 9/2015 | Shwartz et al. | |
| 9,158,189 B2 | 10/2015 | Joseph | |
| 9,186,903 B2 | 11/2015 | McClard et al. | |
| 2001/0041247 A1 | 11/2001 | Scheffer et al. | |
| 2002/0117770 A1 * | 8/2002 | Haynes | D04H 3/02 |
| | | | 264/210.8 |
| 2003/0181110 A1 | 9/2003 | Bouvant | |
| 2004/0259444 A1 | 12/2004 | Lin et al. | |
| 2006/0003668 A1 * | 1/2006 | Aerts | A41C 5/005 |
| | | | 450/39 |
| 2006/0222828 A1 | 10/2006 | Sinto et al. | |
| 2007/0218267 A1 * | 9/2007 | Votel | B32B 5/16 |
| | | | 442/376 |
| 2007/0286982 A1 | 12/2007 | Higgins et al. | |
| 2008/0005823 A1 | 1/2008 | Hung | |
| 2009/0068412 A1 | 3/2009 | Nahmias et al. | |
| 2009/0126074 A1 | 5/2009 | Mattesky | |
| 2010/0031423 A1 | 2/2010 | Cincotti et al. | |
| 2010/0192280 A1 * | 8/2010 | McClard | B44C 1/1712 |
| | | | 428/172 |
| 2010/0199406 A1 * | 8/2010 | Dua | D06H 5/00 |
| | | | 2/115 |
| 2010/0304105 A1 | 12/2010 | Nasarczyk | |
| 2011/0039468 A1 * | 2/2011 | Baldwin, Jr. | B32B 27/20 |
| | | | 442/381 |
| 2012/0005797 A1 * | 1/2012 | Cotsoglou | A41D 13/05 |
| | | | 2/22 |
| 2012/0005808 A1 | 1/2012 | Shwartz et al. | |
| 2012/0034832 A1 | 2/2012 | Morgan et al. | |
| 2013/0031694 A1 * | 2/2013 | Foster | A41D 27/08 |
| | | | 2/69 |
| 2013/0196109 A1 | 8/2013 | Rock et al. | |
| 2014/0378017 A1 | 12/2014 | Ferry et al. | |
| 2015/0306840 A1 | 10/2015 | Ferguson, Jr. | |
| 2016/0023428 A1 | 1/2016 | Adams et al. | |
| 2016/0157638 A1 | 6/2016 | Waters et al. | |
| 2016/0165990 A1 | 6/2016 | Peterson | |
| 2018/0066921 A1 | 3/2018 | Wagner et al. | |

FOREIGN PATENT DOCUMENTS

| | | | | |
|---|---|---|---|---|
| CN | 202664306 U | 1/2013 | | |
| CN | 103057234 A | 4/2013 | | |
| CN | 103416880 A | 12/2013 | | |
| CN | 203378597 U | 1/2014 | | |
| CN | 104057683 A | 9/2014 | | |
| CN | 104248117 A | 12/2014 | | |
| CN | 104249506 A | 12/2014 | | |
| CN | 104249531 A | 12/2014 | | |
| DE | 102012002805 A1 * | 8/2013 | | A41D 27/02 |
| EP | 1042015 B1 | 3/2003 | | |
| EP | 1362695 B1 | 7/2006 | | |
| EP | 1610664 B1 | 10/2006 | | |
| EP | 2628848 A2 | 8/2013 | | |
| EP | 2682013 B1 | 8/2016 | | |
| FR | 2642701 B3 | 4/1991 | | |
| GB | 1040598 A | 9/1966 | | |
| JP | 2000129512 A * | 5/2000 | | A41D 1/04 |
| JP | 3092780 U | 1/2003 | | |
| JP | 2016044381 A | 4/2016 | | |
| KR | 101444650 B1 * | 9/2014 | | |
| KR | 101524066 B1 | 5/2015 | | |
| TW | 235652 B | 7/2005 | | |
| TW | M451548 U | 4/2013 | | |
| WO | WO-0108883 A1 * | 2/2001 | | B32B 7/12 |
| WO | WO-2004089614 A2 * | 10/2004 | | A41D 31/102 |

OTHER PUBLICATIONS

Tausif, M., T. Cassidy, and I. Butcher. "Yarn and thread manufacturing methods for high-performance apparel." High-Performance Apparel. Woodhead Publishing, 2018. 33-73. (Year: 2018).*
Swain, Peter, "Sublimation 101", Sawgrass Technologies, 2011 Edition (Year: 2011).*
"Complete Textile Glossary", Celasnese Acetate, 2001, p. 99 (Year: 2001).*
English translation of DE 102012002805 A1 obtained from Google Patents (Year: 2012).*
White, Steven, "The Advantages & Disadvantages of Woven Fabrics", Sep. 28, 2017 (Year: 2017).*
Supporting evidence provided by Inda, "About Nonwovens" (Year: 2022).*
Zellers, Jane, "Dealing with Batting and Fiberfill" (Year: 2022).*
Nonwoven Fabrics in Apparel, INDA, Mar. 10, 2017 obtained from the Wayback Machine. (Year: 2017).*
Militky, Jiri. "The chemistry, manufacture and tensile behaviour of polyester fibers." Handbook of tensile properties of textile and technical fibres. Woodhead Publishing, 2009. 223-314. (Year: 2009).*
Woven Fabric, Textile Glossary, p. 181, Celanese Acetate, 2001. (Year: 2001).*
Film, American Heritage Dictionary, HarperCollins, 2022. (Year: 2022).*
Thickness Characteristics, Films, Toray Group, 2023. (Year: 2023).*
Organza, Wikipedia, Jan. 25, 2024, https://en.wikipedia.org/wiki/Organza (Year: 2024).*
Foil Printing: The Most Common Questions Answered, Beyond the Blank, Bella + Canvas, Nov. 30, 2017—obtained from Wayback Machine (Year: 2017).*
English translation of KR 101444650 B1 obtained from Espacenet (Year: 2014).*
Cottonbee, Fabric Weight Guide—Everything You Need to Know, 2022. (Year: 2022).*
Das, A. "Testing and statistical quality control in textile manufacturing." Process control in textile manufacturing. Woodhead Publishing, 2013. 41-78. (Year: 2013).*
Ryonet, "Screen Printing On Polyester Mesh Jerseys," You Tube, youtube.com. Feb. 20, 2012. https://www.youtub e.com/watch?v=SclnM-nVYUQ&gl=US&hl=en.
"Graphic Print Zipper Detail Mesh Panel Swimsuit," Schein, us.shein.com, May 16, 2017. https:// web.archive.org/web/20170516053817/http://us.shein.com/Black-Graphic-Print-Zipper-Detail-Mesh-One-Piece-Swimwear-p-338271-cat-1866.html.
Davis, Rick, "Screen Printing: Process + Techniques—Screen Printing on 100% Polyester Mesh," Impressions, impressionsmagazine.com, Aug. 20, 2014. https://www.impressionsmagazine.com/screen-printing/process-techniques/screen-printing-on-100-polyester-mesh/.

(56)     References Cited

OTHER PUBLICATIONS

"Full Color Amp—Cab—Side Stage Scrims," Ace High Printing, acehighprint.com, Jun. 24, 2012. https://web.archive.org/web/20 120624225513/http://www.acehighprint.com:80/scrims.html.

"Products," Printhead Studio™, printheadstudio.com, accessed: Jan. 2018. https://www.printheadstudio.com/products.

Compare Sunsetter Awning Fabrics, Jan. 1, 2011, http://www. patioshoppers.com/pages/SNS_Fabrics.html.

International Search Report and Written Opinion mailed Jun. 4, 2019 in International Patent Application No. PCT/US2019/024503, 13 pages.

International Preliminary Report on Patentability received for PCT Patent Application No. PCT/US2019/024503, mailed on Dec. 10, 2020, 8 pages.

Office Action received for European Patent Application No. 19716750. 5, mailed on Oct. 12, 2021, 4 pages.

Office Action received for European Patent Application No. 19716750. 5, mailed on Nov. 28, 2022, 4 pages.

Extended European Search Report and Search Opinion received for European Application No. 24203567.3, mailed on Jan. 17, 2025, 6 pages.

* cited by examiner

MULTILAYER TEXTILE HAVING PRINTED LAYER

CROSS-REFERENCE TO RELATED APPLICATIONS

The Non-Provisional application Ser. No. 16/358,450, and entitled MULTILAYER TEXTILE HAVING PRINTED LAYER," claims the benefit of U.S. Provisional Application No. 62/678,352, filed May 31, 2018, and entitled "MULTI-LAYER TEXTILE HAVING PRINTED LAYER," the entirety of which is incorporated by reference herein.

TECHNICAL FIELD

Aspects herein are related to a multilayer textile having a printed layer that is overlaid by another layer.

BACKGROUND

Traditional textiles have a printed layer that is generally an outermost layer.

DESCRIPTION OF THE DRAWINGS

Examples of aspects herein are described in detail below with reference to the attached drawing figures, wherein.

DETAILED DESCRIPTION

Figure 1:
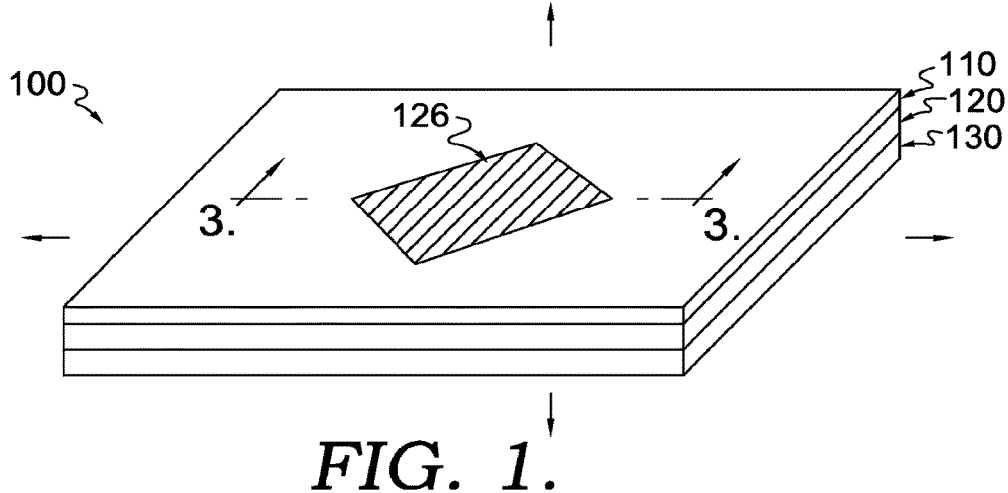
FIG. 1 illustrates a perspective view a multilayer textile in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

At a high level, aspects herein relate to a multilayer textile and garments incorporating the multilayer textile. In one aspect, the multilayer textile comprises a first layer formed from, for instance, a woven material and comprising a first surface and an opposite second surface. In aspects, when the multilayer textile is incorporated into a garment, the first layer may comprise an outermost layer of the garment. The multilayer textile further comprises a second layer formed from, for instance, a non-woven material and comprising a third surface and an opposite fourth surface, where the third surface is positioned adjacent to the second surface of the first layer. In aspects, the first layer is configured to be at least partially translucent, and the second layer further comprises a printed component such as a sublimation-printed component. In one aspect, the sublimation-printed component is located on at least a portion of the third surface and at least partially extends through the second layer toward the fourth surface. The result is a multilayer textile that has an aesthetic feature that is visible through the first layer (or outermost layer of a garment).

In another aspect, a multilayer textile comprises a first layer formed from, for instance, a first woven material having a weight ranging from about 40 gram per square meter (GSM) to about 75 GSM and being formed from one or more multifilament yarns having a denier ranging from about 7 denier to about 40 denier. As used herein, the term "about" means within 10% of a given value. The multilayer textile further comprises a second layer formed from, for instance, a non-woven material having a weight equal to or greater than about 35 GSM and a third layer formed from, for instance, a fiberfill material. Moreover, the first layer has a first surface and an opposite second surface, the second layer has a third surface and an opposite fourth surface, and the third layer has a fifth surface and an opposite sixth surface. Further, the third surface of the second layer is positioned adjacent to the second surface of the first layer, and the fifth surface of the third layer is positioned adjacent to the fourth surface of the second layer. In aspects, the second layer has a sublimation-printed component, which may be located on at least a portion of the third surface and may at least partially extend through the second layer from the third surface toward the fourth surface. The result is a multilayer textile that has an aesthetic feature at least partially visible through the first layer and also has insulation features.

Continuing, from a functional perspective, areas of the multilayer textile comprising the first layer, the second layer, and the third layer exhibit features generally associated with each layer such as translucency, a visual or printed component (e.g., sublimation-printed component of the second layer is at least partially visible through the first layer), and insulation. Such features may be afforded to a layer by one or more materials used to form the respective layer and by a manner in which the respective layer is constructed. For instance, the first layer may be formed from a woven material comprising one or more multifilament yarns and a woven structure such that the first layer is at least partially translucent. In another instance, the second layer may be formed from a non-woven material comprising a plurality of fibers and entanglement of the same such that the non-woven material is both compatible with and capable of withstanding a sublimation printing technique such that a sublimation-printed component may be formed on the second layer via sublimation printing. In yet another instance, the third layer may be formed by a loose fiberfill material configured such that the third layer, at least partially, retains, for example, body heat generated by a wearer. When the multilayer textile is incorporated into a garment, the first, second, and third layers may be respectively arranged in the multilayer textile such that the first and second layers may be positioned in the garment to display or present the visual component on an outer face of the garment, and the third layer may be positioned in the garment to correspond to areas of heat loss of the human body when the garment is in an as-worn configuration as based on, for instance, heat maps of the human body.

Aspects herein are further directed to a method of forming a multilayer textile having the properties described above. In aspects, the method may comprise a first step of forming a second layer from a non-woven material having a weight equal to or greater than about 35 GSM and comprising a plurality of fibers or filaments having a composition comprising a polymer. The second layer may have a third surface and an opposite fourth surface. Next, a sublimation-printed component may be formed on the second layer by performing a sublimation printing technique on the third surface of the second layer. Subsequent to forming the sublimation-printed component, the second layer may then be combined with a first layer that may be formed of a first woven material and configured to be at least partially translucent. The first layer may have a first surface and a second surface, and the first layer and the second layer may be combined to form a first and second layer combination in which the third surface of the second layer may be positioned adjacent to a second surface of the first layer. Once combined, the first and second layer combination may be utilized as a multilayer textile with two layers.

In further aspects, the method may also comprise optional, additional steps after the second layer and the first layer have been combined to form a multilayer textile with three layers or four layers. In such aspects, either a third layer formed of a fiberfill material and having a fifth surface and an opposite sixth surface or a fourth layer formed of a second woven material and having a seventh surface and an opposite eighth surface, may be combined individually with the first and second layer combination to form a multilayer textile with three layers. For instance, the third layer may be combined with the first and second layer combination such that the fourth surface of the second layer is adjacent to the fifth surface of the third layer, or in a similar fashion, the fourth layer may be combined with the first and second layer combination such that the fourth surface of the second layer is adjacent to the seventh surface of the fourth layer. Once combined, the first and second layer combination and either the third layer or the fourth layer may be utilized as a multilayer textile with three layers. To form a multilayer textile with four layers, the first and second layer combination and the third layer may be combined with the fourth layer such that the sixth surface of the third layer is positioned adjacent to the seventh surface of the fourth layer.

Continuing, any of the first, second, third, or fourth layers may be combined such that one or more layers of the multilayer textile may be positioned and/or joined to one or more other layers in a variety ways, which may be dictated by factors such as an end use, number of layers, materials of each layer, and the like. As such, the terms "combine," "combined," and "combination" when describing one or more layers of a multilayer textile broadly refers to an general arrangement of two or more layers in the multilayer textile and is not limiting as to a manner in which one or more of the layers is positioned or joined to one or more other layers in the multilayer textile. For example, when the first layer, the second layer and the fourth layer are combined such that the third surface of the second layer is positioned adjacent to the second surface of the first layer and the fourth surface of the second layer is positioned adjacent to the seventh surface of the fourth layer, it may be understood that the first, second, and fourth layers are arranged in an order of the first layer, then the second layer, and then the fourth layer. Moreover, it may be understood that the first, second, and fourth layers may be positioned (e.g., degree of rotation with respect to one another, degree of overlap with each other, and the like) in any manner contemplated herein, and may be joined in any manner contemplated herein.

In aspects, each layer may be combined such that the one or more layers are positioned and/or joined to one another to achieve a particular aesthetic and/or functional effect. For instance, when the first layer, the second layer, and the fourth layer are combined, the first layer and the fourth layer may be positioned to fully overlay an entirety of the second layer such that the perimeter edges of the first layer and the fourth layer extend beyond the perimeter edges of the second layer, and the first layer and the fourth layer may be affixed to one another along their respective perimeter edges. Further, in an example aspect, the second layer may not be joined to either the first layer or the fourth layer, and thus, the second layer may "float" between the first layer and the fourth layer. The result is the second layer may be movable to one or more areas of the multilayer textile, and in turn, the sublimation-printed component of the second layer is also visible through the first layer at the one or more areas.

Continuing, parameters associated with each layer may also be selected to achieve a particular aesthetic and functional effect. For instance, the selection of a woven material including a fine denier of the one or more multifilament yarns (e.g., from about 7 denier to about 40 denier), a light color of the one or more multifilament yarns (e.g., white and light shades of grey, red, orange, yellow, green, and blue), and/or a light weight (e.g., from about 40 GSM to about 75 GSM) for the first layer may increase translucency and in turn, promote a greater visibility of the sublimation-printed component of the second layer through the first layer. In another instance, a selection of a non-woven material including a plurality of fibers or filaments, each of which have a composition comprising a polymer compatible with sublimation dyes (e.g., polyethylene terephthalate (PET)), and/or a sufficient weight to withstand high temperatures and pressure (equal to or greater than about 35 GSM) for the second layer may increase a transfer, absorption, and or retention of sublimation dyes and as result, promote a greater visibility of the sublimation-printed component through the first layer. In yet another instance, a selection of parameters associated with a sublimation printing technique may be adjusted to promote visibility of the sublimation-printed component through the first layer. For instance, a temperature range and a duration of a sublimation printing technique may be selected such that the sublimation-printed component may have a sufficient amount of vividness and detail while maintaining a structural integrity of the woven material.

Aspects herein that relate to the first layer contemplate that a woven material that forms the first layer may include one or more multifilament yarns, one or more monofilament yarns, or a combination of one or more multifilament or monofilament and yarns. In aspects, one or more monofilament and/or multifilament yarns included in a woven material that forms that first layer may have one or more visual components configured to facilitate translucency of the first layer and may include, for example, transparency, color, haze, gloss, and/or reflectivity. The visual component may be afforded by the material that forms the monofilament and/or multifilament yarn or may be imparted to the monofilament and/or multifilament yarn by using an application technique compatible with both a respective visual component and the monofilament and/or multifilament yarn. In one aspect, a visual component may be afforded by a material that interacts with light in a manner such that the monofilament and/or multifilament yarn included in the material may be reflective, clear, glossy, metallic, exhibit shimmer, and the like. In another aspect, a visual component may be imparted by dyes, inks, pigments, finishes, and the like such that the monofilament and/or multifilament yarn may be a light color (e.g., white and light shades of grey, red, orange, yellow, green, and blue), reflective, glossy, metallic, and the like.

Accordingly, aspects herein relate to a multilayer textile that forms one or more portions of the garment. The multilayer textile comprises a first layer formed from a woven material, where the first layer comprises a first surface and an opposite second surface. The multilayer textile further comprises a second layer formed from a non-woven material, where the second layer comprises a third surface and an opposite fourth surface, and where the third surface is positioned adjacent to the second surface of the first layer. Further, the second layer comprises a sublimation-printed component and the first layer is at least partially translucent.

Aspects herein are additionally directed to a multilayer textile comprising a first layer formed from a first woven material having a weight ranging from about 40 grams per meter squared (GSM) to about 75 GSM, the first woven material formed from one or more multifilament yarns having a denier ranging from about 7 denier to about 40 denier, the first layer having a first surface and an opposite second surface. In addition, the multilayer textile comprises a second layer formed from a non-woven material having a weight equal to or greater than about 35 GSM, the second layer having a third surface and an opposite fourth surface, the third surface positioned adjacent to the second surface of the first layer, the second layer having a sublimation-printed component. And further, the multilayer textile also comprises a third layer formed from a fiberfill material, the third layer having a fifth surface and an opposite sixth surface, the fifth surface positioned adjacent to the fourth surface of the second layer.

Aspects herein are further directed to a garment comprising a multilayer textile that forms one or more portions of the garment, the multilayer textile comprising a first layer formed from a woven material and comprising a first surface and an opposite second surface. The multilayer textile additionally comprises a second layer formed from a non-woven material, where the second layer comprises a third surface and an opposite fourth surface. The third surface is positioned adjacent to the second surface of the first layer. The second layer comprises a sublimation-printed component, where the sublimation-printed component at least partially extends through the second layer towards the fourth surface. Additionally, the first layer is at least partially translucent.

Positional terms as used herein to describe a garment such as "anterior," "posterior," "front," "back," "upper," "lower," "interior surface," "exterior surface," "outermost layer," "innermost layer" and the like are with respect to the garment being worn as shown and described herein by a wearer standing in an upright position. The terms "join" and "joined" when describing, for example an attachment of a layer with one or more other layers means a coupling of one layer to another in a manner that is sufficient to maintain a position of each layer relative the other and includes, for example, both permanent coupling technologies such as stitching, quilting, sewing, felting, laminating, entangling, bonding, adhesives, and releasable coupling technologies such as releasable adhesives, hook-and-loop fasteners, snaps, buttons, zippers, and the like.

Continuing, the term "woven" when describing, for example, a material means a material formed by weaving one or more multifilament and/or or monofilament warp and weft yarns such that the warp and weft yarns are positioned generally orthogonally relative to one another, which may include simple or compound woven structures known by those skilled in the art. The term "multifilament yarn" as used herein means a yarn having two or more filaments within a single yarn strand while the term "monofilament" as used herein means a yarn formed from a single filament. Continuing still, the term "terephthalate polymer" when describing, for example, a yarn means a yarn having filaments and/or fibers formed from terephthalate polymers and includes, for example, polyethylene terephthalate (PET) (commonly known as polyester), poly 1,4 cyclohexylene-dimethylene terephthalate (PCDT), polybutylene terephthalate (PBT) and polytrimethylene terephthalate (PTT). The term "polyamide" when describing yarns means a yarn having filaments formed from any long-chain synthetic polyamide (commonly known as nylon).

Continuing still, the term "translucency" relates to a transmission of light, and "translucent" refers to a physical property of an object when a light strikes its surface in which some of the light is passed or transmitted through the object and some of the light is diffused, reflected, and/or absorbed. Generally, the transmission of light is categorized as transparency, translucency, or opacity, each of which corresponds to a different interaction between an object and a light striking a surface thereof. As such, "transparent" refers to a physical property of an object when a light strikes its surface in which all of the light is passed or transmitted through the object and none of the light is diffused and/or absorbed. "Opaque" refers to a physical property of an object when a light strikes its surface in which none of the light is passed or transmitted through the object and all of the light is diffused and/or absorbed. In accordance with aspects herein, an object may be determined to be transparent, translucent, or opaque by using instruments and/or methods known by those skilled in the art to measure and/or calculate a transmittance of an object.

Thus, the term "translucent" when describing a layer means a layer through which light partially passes through. Further, when a layer is referred to herein as "at least partially" translucent, it is to be understood that "at least partially" refers to a portion, area, or location of the layer at which the layer is translucent and is not referring to a transmittance of the layer. For instance, a layer of the multilayer textile that is at least partially translucent means that at some portion, area, or location of the layer light partially passes through. In another instance, a layer that is at least partially translucent means that at one or more portions of the layer, light partially passes through and at other, different portions of the layer, light may or may not partially pass through.

Continuing further, the term "non-woven" when describing, for example, a material means a material formed by a physical movement of a plurality of fibers or filaments into contact to cause a frictional and/or mechanical intertwinement and/or by a chemical or thermal bonding of a plurality of fibers or filaments such that a fiber or filament entanglement is formed. The physical movement of two or more fibers or filaments be may be accomplished by using a variety of techniques and includes, for example, one or more barbs of a barbed needle, one or more sharp tips of a structured needle, and/or a focused stream of fluid such as fluid (e.g., air) or waterjet entanglement. The term "fiberfill material" as used herein means a material formed of multiple staple fibers (e.g., synthetic fibers) configured to have insulating and/or cushioning properties (e.g., loft) and includes, for example, polyester fiberfill, polyfill, and the like. In general, the staple fibers are generally unbonded or unentangled or bonded or entangled to a lesser extent than the non-woven materials described herein.

As well, the term "sublimation printing technique" as used herein means a printing technique that utilizes heat and pressure to apply dyes to a substrate and includes any sublimation printing process, technique, or method known by those skilled in the art such as, for example, digital printing, inkjet printing, and the like. Generally, a sublimation printing technique may apply one or more sublimation dyes, which refer to a colored substance that has an affinity to a substrate (e.g., the second layer prior to forming the multilayer textile) and is applied thereto via sublimation printing. The colored substance may be derived from plant or synthetic sources that may be finely ground and included with a dispersing agent, and a sublimation dye may infuse into the substrate at the molecular level and impregnate color into a material. As understood by those skilled in the art, sublimation printing utilizes the science of sublimation, in which heat is applied to a solid, turning it into a gas through an endothermic reaction without passing through the liquid phase.

Continuing, at a high level, sublimation printing may include solid, heat-sensitive dyes, dissolved in a liquid that, when under heat and pressure, change into gas, bond with a compatible substrate, and then change back into a solid. As a result, sublimation dyes are infused into a substrate at the molecular level, rather than being applied on a surface of a substrate. Further, sublimation printing techniques contemplated herein may utilize a variety of components and techniques to apply a sublimation dye to a substrate (e.g., the second layer prior to forming the multilayer textile), and different sublimation printing techniques may include similar and/or different aspects. For instance, one sublimation printing technique may apply a sublimation dye to the second layer differently than another, but these same sublimation printing techniques may include a sublimation printer and may also use heat or energy to cause absorption of a sublimation dye by the second layer.

Continuing still, in aspects, a sublimation printing technique may include applying sublimation dyes to a transfer sheet using a heat transfer, and in other aspects, the sublimation dyes may be applied to a transfer sheet using an ink jet printer. In either aspect, the transfer sheet is then be applied to the second layer prior to forming the multilayer textile with a heat press under high heat, of about 200 C, and for about 20 seconds, in one non-limiting example. While 20 seconds is provided, it is contemplated that the heat press may be applied for any amount of time, from about 15 seconds to 1 minute, in another non-limiting example. As a result, the sublimation dyes are transferred from the transfer paper to the second layer prior to forming the multilayer textile and are absorbed by at least a portion of the second layer.

Continuing further, the term "sublimation-printed component" as used herein means an image, graphic, design or visual indicia formed on a layer by one or more sublimation dyes that were applied to the layer via a sublimation printing technique in accordance with aspects herein. Moreover, a sublimation-printed component may also include shapes including shapes associated with branding such as logos, images and the like, geometric shapes, organic shapes, letters, numbers, and the like. Further, a sublimation printed component may be formed, at least in part, by one or more colors afforded by one or more sublimation dyes, which may be configured to be of any color including red, orange, yellow, green, blue, indigo, violet, shades thereof.

Turning now to FIG. 1, a perspective view of a multilayer textile 100 is illustrated in accordance with aspects herein. The multilayer textile 100 comprises a first layer 110, a second layer 120, and a third layer 130. The second layer 120 is positioned between the first layer 110 and the third layer 130, and a sublimation-printed component 126 of the second layer 120 is visible through the first layer 110. As shown in FIG. 1, each of the first, second, and third layers 110, 120, 130 are relatively planar, substantially flat, and arranged in the multilayer textile 100 in a same orientation, which can be thought of as extending in respective x, y planes that are generally parallel with one another. Moreover, the first, second, and third layers 110, 120, 130 are vertically aligned, coplanar, vary in thickness, and occupy a same amount surface area and share a common position in an x, y plane. As such, each of the first, second, and third layers 110, 120, 130 are positioned in an overlapping manner such that the first layer 110 overlays the second layer 120, the second layer 120 overlays the third layer 130, and none of the first, second, and third layers 110, 120, 130 laterally extend beyond one another in the multilayer textile 100. This is just one example, other aspects herein contemplate that the perimeter edges of one or more layers may extend beyond the perimeter edges of one or more other layers.

In FIG. 1, the multilayer textile 100, each of the first, second, and third layers 110, 120, 130, and the sublimation-printed component 126 are depicted generically for discussion purposes and may be repositioned, reshaped, or reconfigured. For instance, a thickness of any of the first, second, and third layers 110, 120, 130 may be decreased, and a demarcation between the first layer 110 and the second layer 120 and the second layer 120 and the third layer 130 may be less pronounced. Further it is understood that these depictions are an example and are not limiting. As such, aspects herein contemplate that the first, second, and third layers 110, 120, 130 may be arranged in an offset manner such that any of the first, second, or third layers 110, 120, 130 may partially overlay or be overlaid by one another. Moreover, aspects herein contemplate that any of the first, second, or third layers 110, 120, 130 may occupy different amounts of surface area in an x, y plane, and in one aspect, the second and third layers 120, 130 occupy a same or similar amount of surface area while the first layer 110 occupies a greater amount of surface area than the second and third layers 120, 130.

Figure 2:
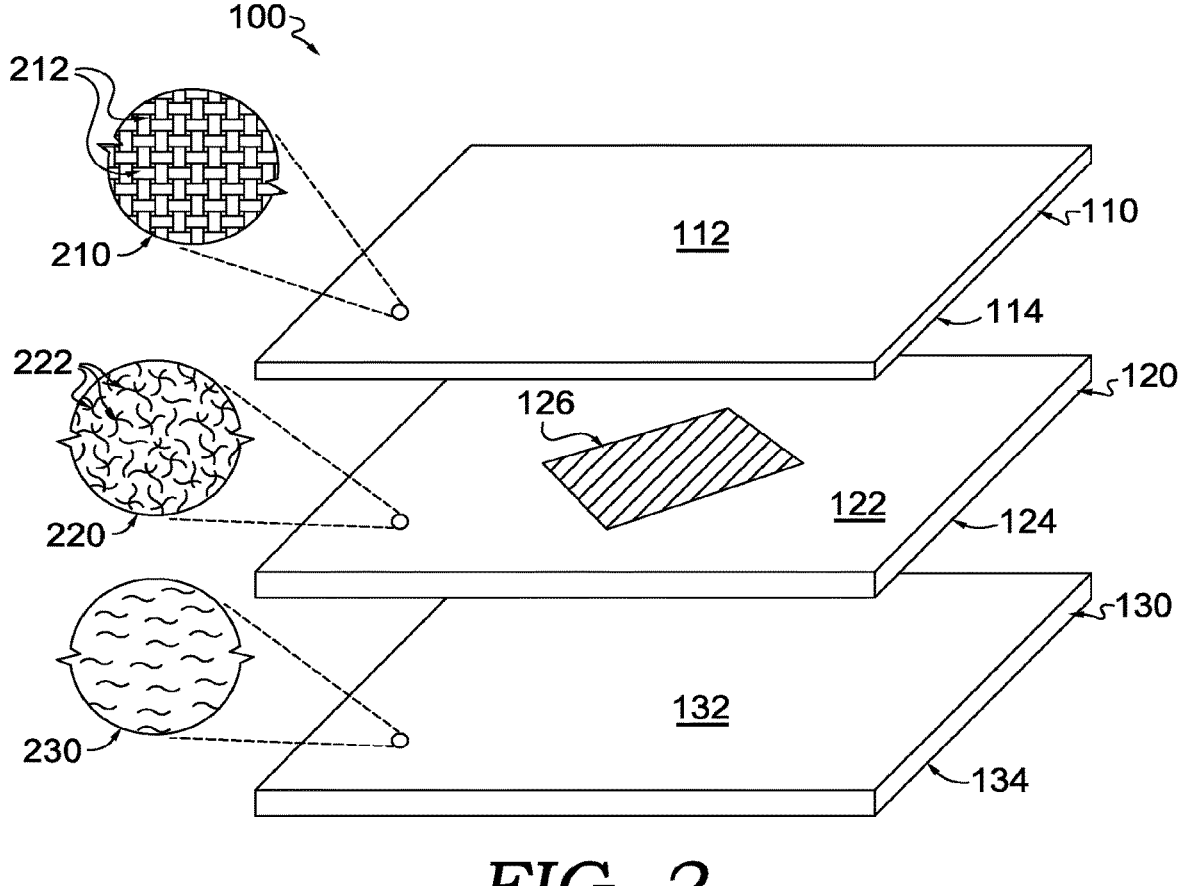
FIG. 2 illustrates an exploded view of the multilayer textile of FIG. 1 to illustrate structural features of a first, second, and third layer in accordance with aspects herein.

With continued reference to FIG. 1 and turning now to FIG. 2, an exploded view of the multilayer textile 100 is illustrated in accordance with aspects herein. As shown in FIG. 2, the first layer 110 has a first surface 112 and an opposite second surface 114, the second layer 120 has a third surface 122 and an opposite fourth surface 124, and the third layer has a fifth surface 132 and an opposite sixth surface 134. Thus, in the multilayer textile 100 as shown in FIG. 1, the third surface 122 of the second layer 120 is positioned adjacent to the second surface 114 of the first layer 110, and the fifth surface of 132 of the third layer 130 is positioned adjacent to the fourth surface 124 of the second layer 120. Continuing, FIG. 2 also includes a magnified view for each of the first, second, and third layers 110, 120, 130, which illustratively depict the first, second, and third layers 110, 120, 130 in accordance with aspects herein.

With regard to the first layer 110 and with continued reference to FIGS. 1 and 2, the first layer 110 is configured such that the sublimation-printed component 126 of the second layer 120 is visible through the first layer 110, and in aspects the first layer 110 is at least partially translucent. In accordance with these aspects, the sublimation-printed component 126 is visible proximate the first surface 112 of the first layer 110, and in the multilayer textile 100, the sublimation-printed component 126 is visible proximate a face of the multilayer textile 100 that is formed by the first surface 112 of the first layer 110. As such, even though the first layer 110 overlays an entirety of the second layer 120, the sublimation-printed component 126 is visible to an observer when viewing the first surface 112 of the first layer 110. Further, as contemplated herein, a translucence of the first layer 110 may be afforded or facilitated by aspects related to a woven material that forms the first layer 110.

In accordance with aspects herein and as depicted in the magnified view of the first layer 110 in FIG. 2, the first layer 110 may be formed from a woven material 210 that comprises one or more multifilament yarns 212 (warp and weft yarns), and the woven material 210 is shown at the first surface 112 as a woven structure formed of the one or more multifilament yarns 212. Moreover, the woven material 210 is configured to have a weight that facilitates translucency of the first layer 110, and further, the one or more multifilament yarns 212 included in the woven material 210 are configured to facilitate translucency of the first layer 110. Further, it is to be understood that the woven material 210, the one or more multifilament yarns 212, and the woven structure are illustratively depicted for discussion purposes and are not limiting.

In aspects, the woven material 210 may have a weight from about 25 GSM to about 79 GSM, from about 27 GSM to about 77 GSM, from about 29 GSM to about 75 GSM, from about 32 GSM to about 72 GSM, from about 34 GSM to about 70 GSM, or from about 40 GSM to about 65 GSM. In one aspect, the woven material 210 may have a weight of about 29 GSM, about 34 GSM, or about 40 GSM.

In further aspects, the one or more multifilament yarns 212 of the woven material 210 may have a denier from about 7 D to about 40 D, from about 10 D to about 35 D, or from about 15 D to about 30 D. In one aspect, the one or more multifilament yarns 212 of the woven material 210 may have a denier of about 10 D, about 15 D, or about 40 D.

In even further aspects, the one or more multifilament yarns 212 may comprise a multifilament yarn composition. In one aspect, the multifilament yarn composition comprises a first polymer, and the first polymer comprises a terephthalate polymer. More specifically, the terephthalate polymer is any one of polyethylene terephthalate (PET), poly 1,4 cyclohexylene-dimethylene terephthalate (PCDT), polybutylene terephthalate (PBT) and polytrimethylene terephthalate (PTT). In an aspect, the terephthalate polymer is polyethylene terephthalate (PET). In another aspect, the multifilament yarn composition comprises a polyamide, and the polyamide comprises a long-chain synthetic polyamide.

Continuing with these aspects, the woven material 210 may also be formed from one or more monofilament yarns that comprise a monofilament yarn composition. In one aspect, the monofilament yarn composition comprises a first polymer, and the first polymer comprises a terephthalate polymer. More specifically, the terephthalate polymer is any one of polyethylene terephthalate (PET), poly 1,4 cyclohexylene-dimethylene terephthalate (PCDT), polybutylene terephthalate (PBT) and polytrimethylene terephthalate (PTT). In an aspect, the terephthalate polymer is polyethylene terephthalate (PET). In another aspect, the monofilament yarn composition comprises a polyamide, and the polyamide comprises a long-chain synthetic polyamide.

Referring back to FIG. 2, the magnified view of the second layer 120 depicts a non-woven material 220 comprising a plurality of fibers 222 (or filaments) in accordance with aspects herein. Moreover, the non-woven material 220 is shown at the third surface 122 as a fiber entanglement formed of the plurality of fibers 222. The sublimation-printed component 126 is located on at least a portion of the third surface 122 and is shown a diamond. The non-woven material 220 is configured to have a weight sufficient to withstand a sublimation printing technique, and the plurality of fibers 222 are configured to facilitate formation of the sublimation-printed component 126 on the second layer 120. Further, it is to be understood that the non-woven material 220, the plurality of fibers 222, the fiber entanglement, and the sublimation-printed component 126 are illustratively depicted for discussion purposes and are not limiting.

In aspects, the non-woven material 220 may have a weight from about 33 GSM to about 47 GSM, from about 35 GSM to about 45 GSM, from about 37 GSM to about 43 GSM, from about 39 GSM to about 41 GSM, or about 40 GSM.

In further aspects, the plurality of fibers 222 may comprises a fiber composition. In one aspect, the fiber composition comprises a second polymer, and the second polymer comprises a terephthalate polymer. More specifically, the terephthalate polymer is any one of polyethylene terephthalate (PET), poly 1,4 cyclohexylene-dimethylene terephthalate (PCDT), polybutylene terephthalate (PBT) and polytrimethylene terephthalate (PTT). In an aspect, the terephthalate polymer is polyethylene terephthalate (PET).

In even further aspects, the non-woven material 220 may be formed by using a fluid entanglement technique to entangle the plurality of fibers 222. Examples of fluid entanglement techniques include waterjet entanglement, hydroentanglement, melt-blown, spunlacing, and the like. Generally, fluid entanglement utilizes high-pressure jets of liquid (or air) to pass into or through the plurality of fibers 222 and physically move portions of one or more of the plurality of fibers 222. In aspects, the liquid jet stream may pass in a single direction (e.g., one surface of the non-woven) or the stream may pass in multiple directions (e.g., both surfaces of the non-woven) to achieve different entanglements, and further, the liquid jet stream conditions and parameters can be altered to change the resulting entanglement. For instance, pressure, stream size, direction, speed, number of passes, stream shape, and the like can be adjusted to alter a resulting fiber entanglement. In one aspect, stream pressure may be sufficient to effectuate greater entanglement of the plurality of fibers to increase durability and form more uniform surfaces, and in turn, the second layer 120 may be more apt for withstanding a sublimation printing technique and may present a better surface for sublimation printing the sublimation-printed component 126.

Continuing with the discussion related to the second layer 120, aspects herein contemplate that the sublimation-printed component 126 may be located on at least a portion of the third surface 122. Even though the sublimation-printed component 126 is depicted as a diamond, aspects herein contemplate that the sublimation-printed component 126 may comprises an image, graphic, design, visual indicia, one or more shapes including shapes associated with branding such as logos, geometric shapes, organic shapes, letters, numbers, and the like. Such aspects further contemplate that the sublimation-printed component 126 may comprise one or more colors afforded by one or more sublimation dyes such as red, orange, yellow, green, blue, indigo, violet, and/or shades thereof.

Moreover, although aspects herein contemplate the sublimation-printed component 126 being formed on the second layer 120 using a sublimation printing technique, aspects herein further contemplate that an alternative printing technique may be used. In such aspects, a printed component is formed, and the printed component may include any combination of the features associated with the sublimation-printed component, aside from those which are directly attributable to using a sublimation printing technique. As such, an alternative printing technique may utilize compatible dyes and/or inks, which may be configured to be of any color including red, orange, yellow, green, blue, indigo, violet, and/or shades thereof, and thus, the printed component may further comprise one or more colors afforded by one or more compatible dyes and/or inks utilized by an alternative printing technique.

In aspects, a foil printing technique may be used to form a printed component on one or more layers (e.g., the first, second, third, and/or fourth layers) of the multilayer textile. Such aspects contemplate that the foil printing technique utilizes one or more dyes and/or inks that are compatible with the foil printing technique and may be configured to be of any color including red, orange, yellow, green, blue, indigo, violet, and/or shades thereof. Moreover, the foil printing technique may be configured such that the one or more compatible dyes and/or inks are applied to a layer of the multilayer textile in a manner that forms the printed component on a surface of the layer, and in turn, the printed component may be located on at least a portion of the layer's surface. Continuing, the printed component may include one or more features and/or any combination thereof of the features associated with the sublimation-printed component. Thus, in accordance with aspects herein, the printed component may comprise an image, graphic, design, visual indicia, one or more shapes including shapes associated with branding such as logos, geometric shapes, organic shapes, letters, numbers, and the like, and further, the printed component may also comprise one or more colors afforded by the one or more dyes and/or inks compatible with the foil printing technique.

In one aspect, a foil printing technique is used to form a printed component on the second layer 120. In more detail, the foil printing technique is configured such that one or more dyes and/or inks that are compatible with the foil printing technique are applied to the second layer 120 at the third surface 122. As a result, the printed component is formed on the second layer 120 and is located on at least a portion of the third surface 122. It is contemplated that the printed component may include any combination of the features associated with the sublimation-printed component 126, aside from those which are directly attributable to using a sublimation printing technique. Accordingly, the printed component may comprises an image, graphic, design, visual indicia, one or more shapes including shapes associated with branding such as logos, geometric shapes, organic shapes, letters, numbers, and/or the like, and the printed component further comprises one or more colors afforded by the one or more dyes and/or inks compatible with the foil printing technique such as red, orange, yellow, green, blue, indigo, violet, and/or shades thereof.

Returning to the discussion related to the second layer 120, aspects herein contemplate that the second layer 120 may include a film. Although not shown, aspects contemplate that the film may be positioned to fully overlay an entirety of the second layer 120 and may be located on the third and/or fourth surfaces 122, 124. In such aspects, the film may be positioned to overlay at least a portion of the second layer 120 and may be located on various portions of the third and/or fourth surfaces 122, 124. In one aspect, the film may be located along perimeter edges of the third and/or fourth surfaces 122, 124, and in another aspect, the film may be located on an interior portion of the third and/or fourth surfaces 122, 124. Moreover, aspects contemplate that the film may be joined to the second layer 120 using various forms of coupling contemplated herein, which include, but are not limited to, stitching, quilting, sewing, felting, laminating, entangling, bonding, adhesives, spot welding, extruding, and the like.

Furthermore, aspects herein contemplate that the film may be configured to achieve a particular aesthetic and functional effect, which may be afforded by parameters associated with the film, such as one or more materials that form the film and/or a manner in which the film is constructed. In aspects related to aesthetic effects, the film may comprises one or more visual components configured to facilitate translucency of the film and may include, for example, transparency, color, haze, gloss, reflectivity, iridescence, and/or pearlescence. In one aspect, the one or more visual components may be configured such that the film is at least partially translucent to promote visibility of the sublimation-printed component 126 of the second layer 120 through the film. In another aspect, the one or more visual components may include a printed component that may be formed on the film using any of the printing techniques contemplated herein. One such aspect contemplates that the film may comprise a visual component that is a printed component, which includes one or more features and/or any combination thereof of the features associated with the sublimation-printed component 126. In yet another aspect, the film may comprise a visual component that is configured to afford the film an iridescent or pearlescent aesthetic effect. In one such aspect, the visual component is a printed component that includes one or more features and/or combination thereof of features associated with the sublimation-printed component 126 that are configured to afford the film an iridescent or pearlescent aesthetic.

Turning to aspects related to functional effects, the film may be configured to comprise various functional properties, which include, but are not limited to, water-proof or water-resistant properties, abrasion resistance properties, insulation properties, and/or structural reinforcement/integrity properties. Such properties may be afforded by one or more materials used to form the film (e.g., a film material and/or a film material composition), by a particular construction of the film, and/or by a manner in which the film is joined to the second layer 120. Aspects contemplate that areas of the second layer 120 that include the film may exhibit features generally associated with the film, and thus, the second layer 120 may comprise water-proof or water-resistant properties, abrasion resistance properties, insulation properties, an/or structural reinforcement/integrity properties. In aspects, such properties may be included in the second layer 120 at areas that include the film and/or at areas positioned nearby the film.

Continuing, aspects herein contemplate that the film may be formed from a film material that comprises a film material composition. In aspects, the film material composition comprises one or more polymers, and in one such aspect, the one or more polymers comprises a terephthalate polymer. More specifically, the terephthalate polymer is any one of polyethylene terephthalate (PET), poly 1,4 cyclohexylene-dimethylene terephthalate (PCDT), polybutylene terephthalate (PBT), and polytrimethylene terephthalate (PTT). In another aspect, the one or more polymers comprises polyurethane (PUR), which may include thermoplastic polyurethane (TPU). In yet another aspect, the one or more polymers comprises polysiloxane (commonly known as silicone).

In aspects, the film material may have a weight from about 3 GSM to about 97 GSM, from about 7 GSM to about 93 GSM, from about 11 GSM to about 89 GSM, from about 15 GSM to about 85 GSM, from about 19 GSM to about 81 GSM, from about 23 GSM to about 79 GSM, from about 27 GSM to about 77 GSM, from about 29 GSM to about 75 GSM, from about 32 GSM to about 72 GSM, from about 34 GSM to about 70 GSM, or from about 40 GSM to about 65 GSM. In one aspect, the film material may have a weight from about 87 GSM to about 93 GSM, and in another aspect, the film material may have a weight of about 90 GSM.

Aspects herein further contemplate that the second layer 120 may include multiple films and that each film of the multiple films may include any combination of the features associated with the film contemplated herein. In such aspects, each film of the multiple films may be discrete and/or separated from one another, may be positioned to overlay a portion of the second layer 120, and may be located on the third and/or fourth surfaces 122, 124. More specifically, each film of the multiple films may be positioned to overlay a different portion of the second layer 120 and may be located on a different portion of the third and/or fourth surfaces 122, 124. In one aspect, the multiple films may be positioned and located such that the multiple films, either individually or in combination, form an image, graphic, design, visual indicia, one or more shapes including shapes associated with branding such as logos, geometric shapes, organic shapes, letters, numbers, and/or the like on the second layer 120 at the third and/or fourth surfaces 122, 124.

Additional aspects herein contemplate that any layer (e.g., the first, second, third, and/or or fourth layers) of the multilayer textile may include the film or the multiple films, which may comprise one or more features and/or any combination thereof of the features associated with the film and/or the multiple films of the second layer 120 contemplated herein. In such aspects, the film or the multiple films may be positioned in a same or similar manner as the film or the multiple films are positioned on the second layer 120, and likewise, the film or the multiple films may be positioned and located on a respective layer and surface thereof in a same or similar manner as the film or the multiples films are positioned on the second layer 120 and located on the third and/or fourth surfaces 122, 124. In other aspects, the film or the multiple films may also be joined to a respective layer using various forms of coupling contemplated herein, which include, but are not limited to, stitching, quilting, sewing, felting, laminating, entangling, bonding, adhesives, spot welding, extruding, and the like.

In even further aspects, the film or the multiple films may be positioned to overlay two or more layers of a multilayer textile and may be located, at least partially, on a surface of each of the two or more layers. In aspects, the film or the multiple films may be positioned between two layers that are overlaid one another in the multilayer textile, and in one aspect, when a surface of one layer is positioned adjacent to a surface of another layer in the multilayer textile, the film or the multiple films may be located, at least partially, on the adjacently positioned surfaces of each of the two layers. In other aspects, when a multilayer textile includes one layer that laterally extends beyond another layer, the film or the multiple films may be positioned to overlay the layer that laterally extends beyond another layer and at least one other layer. Moreover, the film or the multiple films may be located, at least partially, on an exterior perimeter edge of at least one of the layers and on a portion of the layer that laterally extends beyond another layer.

Figure 3:
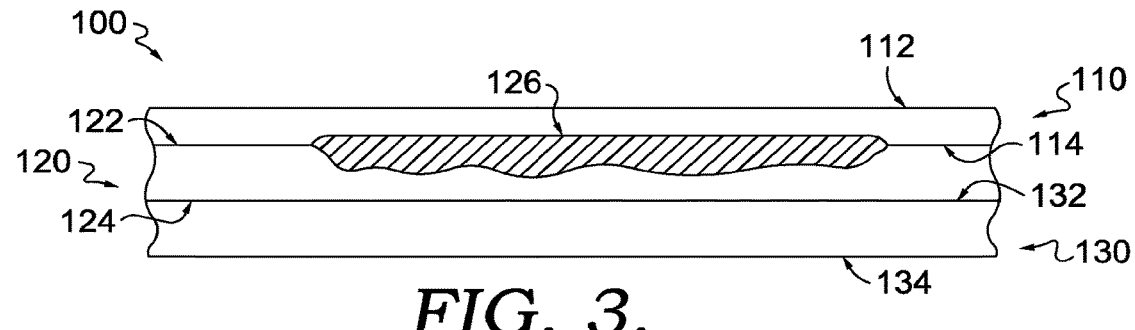
FIG. 3 illustrates a cross-sectional view of the multilayer textile of FIG. 1 taken along the cut line 3-3 of FIG. 1 in accordance with aspects herein.

Returning to the discussions related to FIGS. 1 and 2 and with additional reference to FIG. 3, which illustrates a cross-sectional view of the multilayer textile 100 taken along the cut line 3-3 of FIG. 1, in aspects, the sublimation-printed component 126 partially extends though the second layer 120 from the third surface 122 toward the fourth surface 124. In accordance with aspects herein, the sublimation-printed component 126 may be formed using a sublimation printing technique, and as a result, one or more sublimation dyes are absorbed by at least a portion of the second layer 120. The first, second, and third layers 110, 120, 130 are arranged in an overlaid manner, as previously discussed above, and as shown in FIG. 3, the second surface 114 of the first layer 110 is positioned adjacent to the third surface 122 of the second layer 120. Further, the fourth surface 124 of the second layer 120 is positioned adjacent to the fifth surface 132 of the third layer 130. As will be discussed in connection with FIGS. 7 and 8 below, the first, second, and third layers 110, 120 and 130 may be joined to one or more other layers in the multilayer textile 100 in accordance with aspects herein.

Referring back again to FIG. 2, in the magnified view of the third layer 130, a fiberfill material 230 is depicted as forming the third layer 130. The fiberfill material 230 may be formed of multiple synthetic fibers (e.g., staple fibers) that may comprise a synthetic fiber composition. Moreover, the synthetic fiber composition may comprise a third polymer that is a terephthalate polymer, and in one aspect, the terephthalate polymer is polyethylene terephthalate (PET). The multiple synthetic fibers may be staple or short fibers that are formed into batts, and in one aspect, the multiple synthetic fibers are configured to afford insulating and/or cushioning properties (e.g., loft) to the third layer 130. Examples of fiberfill material that may form the third layer 130 include polyester fiberfill, polyfill, and the like.

Figure 4:
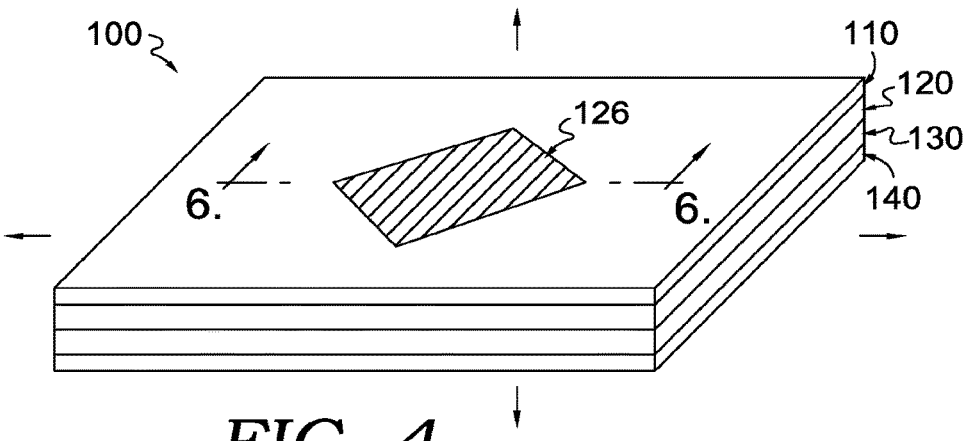
FIG. 4 illustrates a perspective view of the multilayer textile of FIG. 1 with an additional fourth layer in accordance with aspects herein.
Figure 5:
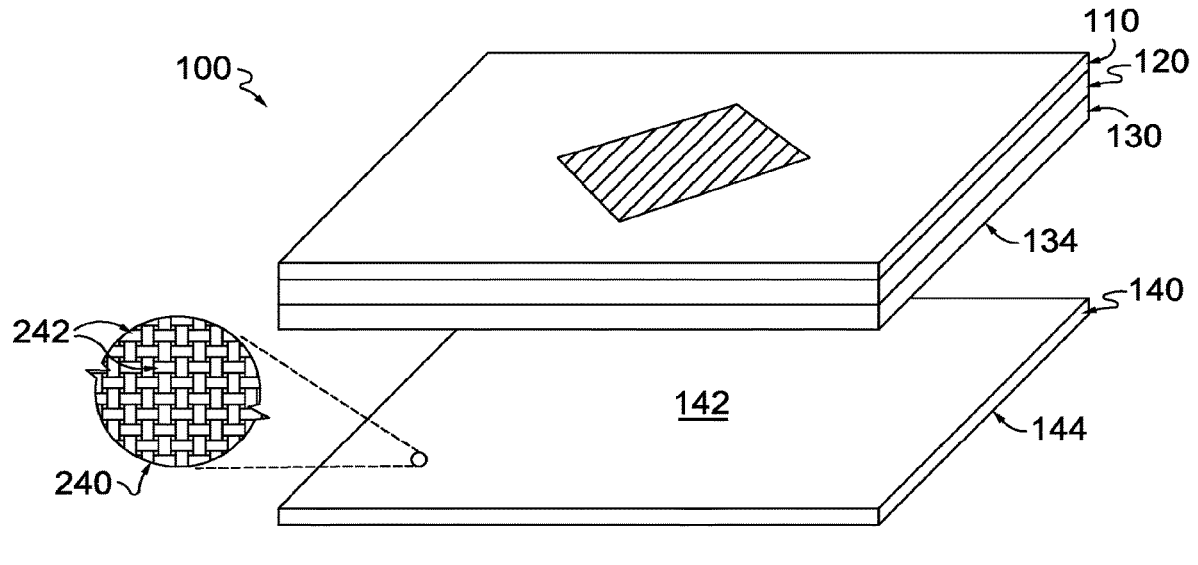
FIG. 5 illustrates a partially exploded view of the multilayer textile of FIG. 4 to illustrate structural features of the first, second, third, and fourth layers in accordance with aspects herein.
Figure 6:
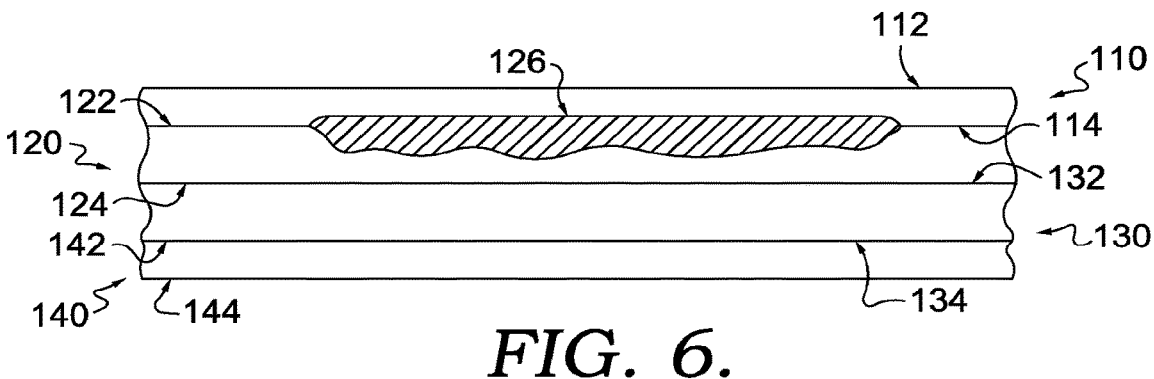
FIG. 6 illustrates a cross-sectional view of the multilayer textile of FIG. 4 taken along the cut line 6-6 of FIG. 4 in accordance with aspects herein.

In FIGS. 4-6, the multilayer textile 100 of FIGS. 1-3 is illustrated with a fourth layer 140, and as such, the first, second, and third layers 110, 120, 130 and aspects thereof are contemplated as comprising the same features in FIGS. 4-6 as those discussed above in connection with FIGS. 1-3. Thus, the multilayer textile 100 of FIGS. 4-6 comprises the first layer 110, the second layer 120, the third layer 130, and the fourth layer 140, which has a seventh surface 142 and an opposite eighth surface 144 (best shown in FIG. 5). In the multilayer textile 100 as shown in FIGS. 4-6, the first, second, and third layers 110, 120, 130 are positioned and arranged in a same manner as in FIGS. 1-3, and with an addition of the fourth layer 140, the seventh surface 142 of the fourth layer 140 is positioned adjacent to the sixth surface 134 of the third layer 130. Continuing, the fourth layer 140 is planar, substantially flat, and arranged in the multilayer textile 100 in a generally same orientation as the first, second, and third layers 110, 120, 130 and extends along a respective x, y, plane that is generally parallel with x, y planes of the other layers. As such, the fourth layer 140 is vertically aligned, coplanar, and occupies a same amount surface area and shares a common position in an x, y plane as the first, second, and third layers 110, 120, and 130. Further, the first, second, third, and fourth layers 110, 120, 130, 140 are positioned in an overlapping manner such that the third layer 130 overlays the fourth layer 140 and none of the first, second, third, and fourth layers 110, 120, 130, 140 laterally extend beyond one another in the multilayer textile 100 in FIGS. 4-6.

Like in FIGS. 1-3, the multilayer textile 100, each of the first, second, third, and fourth layers 110, 120, 130, 140, and the sublimation-printed component 126 are depicted in FIGS. 4-6 generically for discussion purposes and thus, may be repositioned, reshaped, or reconfigured. Further it is understood that these depictions are an example and are not limiting. As such, aspects herein contemplate that the first, second, third, and fourth layers 110, 120, 130, 140 may be arranged in an offset manner such that any of the first, second, third, and fourth layers 110, 120, 130, 140 may only partially overlay or be overlaid by one another. Moreover, aspects herein contemplate that any of the first, second, third, and fourth layers 110, 120, 130, 140 may occupy different amounts of surface area in an x, y plane, and in one aspect, the second and third layers 120, 130 occupy a same or similar amount of surface area while the first and fourth layers 110, 140 occupy a greater amount of surface area than the second and third layers 120, 130.

Continuing with the fourth layer 140, aspects herein contemplate that the fourth layer 140 may comprise any combination of the features associated the first layer 110. Thus, aspects discussed in connection with the first layer 110 are to be understood as applying to the fourth layer 140 as well. In some aspects, the fourth layer 140 is contemplated as being translucent, like the first layer 110, and thus, a translucence of the fourth layer 140 may be afforded or facilitated by aspects related to a woven material that forms the fourth layer 140, which may be a same or similar woven material that forms the first layer 110.

In accordance with aspects herein and as depicted in the magnified view of the fourth layer 140 in FIG. 5, the fourth layer 140 may be formed from a woven material 240 that comprises one or more multifilament yarns 242 (warp and weft yarns), and the woven material 240 is shown at the seventh surface 142 as a woven structure formed of the one or more multifilament yarns 242. Moreover, the woven material 240 is configured to have a weight that facilitates translucency of the fourth layer 140, and further, the one or more multifilament yarns 242 included in the woven material 240 are configured to facilitate translucency the fourth layer 140. Further, it is to be understood that the woven material 240, the one or more multifilament yarns 242, and the woven structure are illustratively depicted for discussion purposes and are not limiting.

In aspects, the woven material 240 may have a weight from about 25 grams per square meter (GSM) to about 79 GSM, from about 27 GSM to about 77 GSM, from about 29 GSM to about 75 GSM, from about 32 GSM to about 72 GSM, from about 34 GSM to about 70 GSM, or from about 40 GSM to about 65 GSM. In one aspect, the woven material 240 may have a weight of about 29 GSM, about 34 GSM, or about 40 GSM.

In further aspects, the one or more multifilament yarns 242 of the woven material 240 may have a denier from about 7 D to about 40 D, from about 10 D to about 35 D, or from about 15 D to about 30 D. In one aspect, the one or more multifilament yarns 242 of the woven material 240 may have a denier of about 10 D, about 15 D, or about 40 D.

In even further aspects, the multifilament yarns 242 of the woven material 240 may comprise a multifilament yarn composition. In one aspect, the multifilament yarn composition comprises a fourth polymer, and the fourth polymer comprises a terephthalate polymer. More specifically, the terephthalate polymer is any one of polyethylene terephthalate (PET), poly 1,4 cyclohexylene-dimethylene terephthalate (PCDT), polybutylene terephthalate (PBT) and polytrimethylene terephthalate (PTT). In an aspect, the terephthalate polymer is polyethylene terephthalate (PET). In another aspect, the multifilament yarn composition comprises a polyamide, and the polyamide comprises a long-chain synthetic polyamide.

Continuing with these aspects, the woven material 240 may further comprise one or more monofilament yarns. In one aspect, the monofilament yarn composition comprises a first polymer, and the first polymer comprises a terephthalate polymer. More specifically, the terephthalate polymer is any one of polyethylene terephthalate (PET), poly 1,4 cyclohexylene-dimethylene terephthalate (PCDT), polybutylene terephthalate (PBT) and polytrimethylene terephthalate (PTT). In an aspect, the terephthalate polymer is polyethylene terephthalate (PET). In another aspect, the monofilament yarn composition comprises a polyamide, and the polyamide comprises a long-chain synthetic polyamide.

With additional reference to FIG. 6, which illustrates a cross-sectional view of the multilayer textile 100 taken along the cut line 6-6 of FIG. 4, in aspects, the sublimation-printed component 126 partially extends though the second layer 120 from the third surface 122 toward the fourth surface 124. In accordance with aspects herein, the sublimation-printed component 126 may be formed using a sublimation printing technique, and as a result, one or more sublimation dyes are absorbed by at least a portion of the second layer 120. The first, second, third, and fourth layers 110, 120, 130, 140 are arranged in an overlaid manner, as previously discussed above, and as shown in FIG. 3, the second surface 114 of the first layer 110 is positioned adjacent to and/or contacts the third surface 122 of the second layer 120. Further, the fourth surface 124 of the second layer 120 is positioned adjacent to and/or contacts the fifth surface 132 of the third layer 130, and the sixth surface 134 of the third layer 130 is positioned adjacent to and/or contacts the seventh surface 142 of the fourth layer 140. As discussed in connection with FIGS. 7 and 8 immediately below, the first, second, third, and fourth layers 110, 120, 130, 140 may be joined to one or more other layers in the multilayer textile 100 in accordance with aspects herein.

Figure 7:
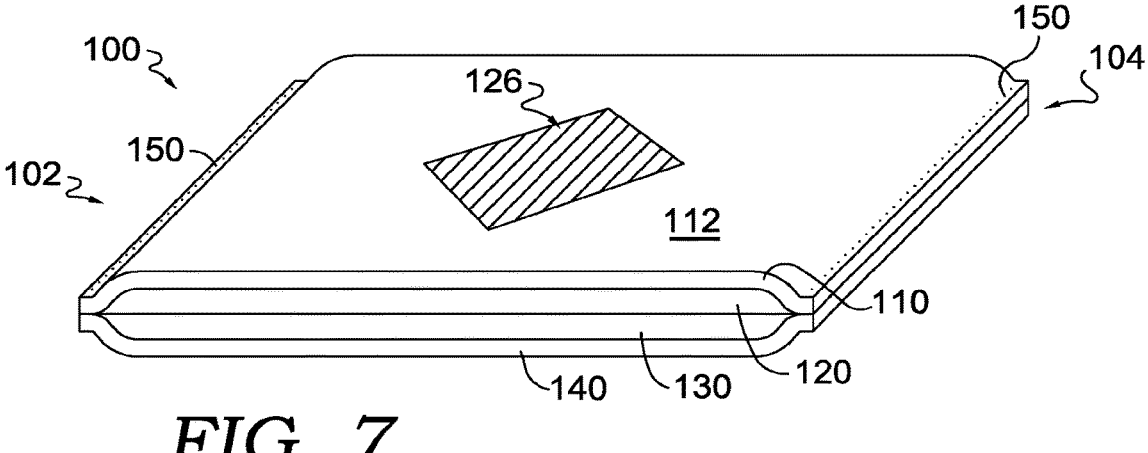
FIG. 7 illustrates a perspective view of the multilayer textile of FIG. 4 to illustrate features associated with two or more layers being joined to one or more other layers in accordance with aspects herein.
Figure 8:
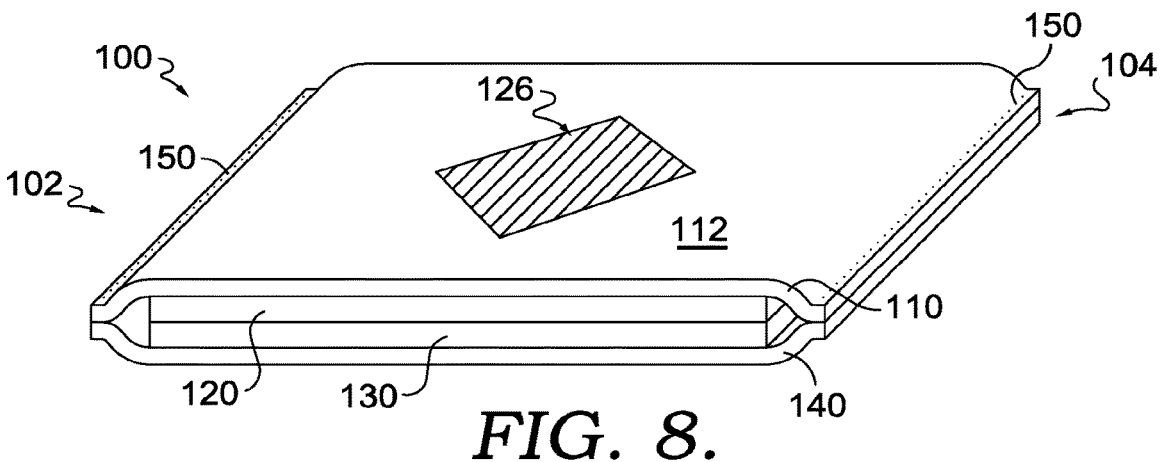
FIG. 8 illustrates a perspective view of the multilayer textile of FIG. 4 to illustrate features associated with two or more layers being joined to one another in accordance with aspects herein.

Turning now to FIGS. 7 and 8, perspective views of the multilayer textile 100 of FIGS. 4-6 with one or more of the first, second, third, and fourth layers 110, 120, 130, 140 joined with one or more other layers is shown. In both FIGS. 7 and 8, the multilayer textile 100 includes a left edge 102, a right edge 104, and a plurality of attachments 150 extending a length of the multilayer textile 100 proximate the left and right edges 102, 104. Moreover, the plurality of attachments 150 are generically represented as dots, and the multilayer textile 100 is slightly tapered at each of the left and right edges 102, 104 to represent two or more layers being joined. Such depictions are for discussion purposes, are to be understood as an example, and are not intended to be limiting. Further, aspects herein contemplate that any one the first, second, third, and fourth layers 110, 120, 130, 140 may be joined to one or more other layers in the multilayer textile 100 using various forms of coupling that are sufficient to maintain a position of each layer relative to a joined layer and the multilayer textile 100. Thus, such aspects contemplate that the plurality of attachments 150 may include one or more forms of coupling including, for example, stitching, quilting, sewing, felting, laminating, entangling, bonding, adhesives, spot welding, and the like.

Focusing on FIG. 7, the first, second, third, and fourth layers 110, 120, 130, 140 are joined by the plurality of attachments 150 proximate at least the left and right edges 102, 104 of the multilayer textile 100. Therefore, a position of the first, second, third, and fourth layers 110, 120, 130, 140 relative to one another and in the multilayer textile 100 is generally fixed. Even though the plurality of attachments 150 are only shown proximate the left and right edges 102, 104, aspects herein contemplate that the plurality of attachments 150 may also extend proximate any remaining edges of the multilayer textile 100 such that the plurality of attachments 150 continually extend around and enclose a majority the multilayer textile 100. In other aspects, the plurality of attachments 150 may traverse the multilayer textile 100 in a manner such that the plurality of attachments 150 continually extend around and enclose one or more interior portions of the multilayer textile 100. It is also contemplated herein that the first, second, third, and fourth layers 110, 120, 130, 140 may be joined together in a quilted construction.

Focusing now on FIG. 8, the first and fourth layers 110, 140 may be joined by the plurality of attachments 150 proximate the left and right edges 102, 104 but are not joined with the second layer 120 or the third layer 130 by the plurality of attachments 150. Thus, a position of the first and fourth layers 110, 140 relative to one another and the multilayer textile 100 is generally fixed, and a position of the second and third layers 120, 130 relative to one another, the first and fourth layers 110, 140, and in the multilayer textile 100 is not fixed (e.g., floated). Although not shown, aspects herein contemplate that the second and third layers 120, 130 may be joined to one another at the fourth surface 124 and the fifth surface 132 by felting or other forms of coupling (entanglement), and in such aspects, a position of the second and third layers 120, 130 relative to another may be fixed.

Figure 9:
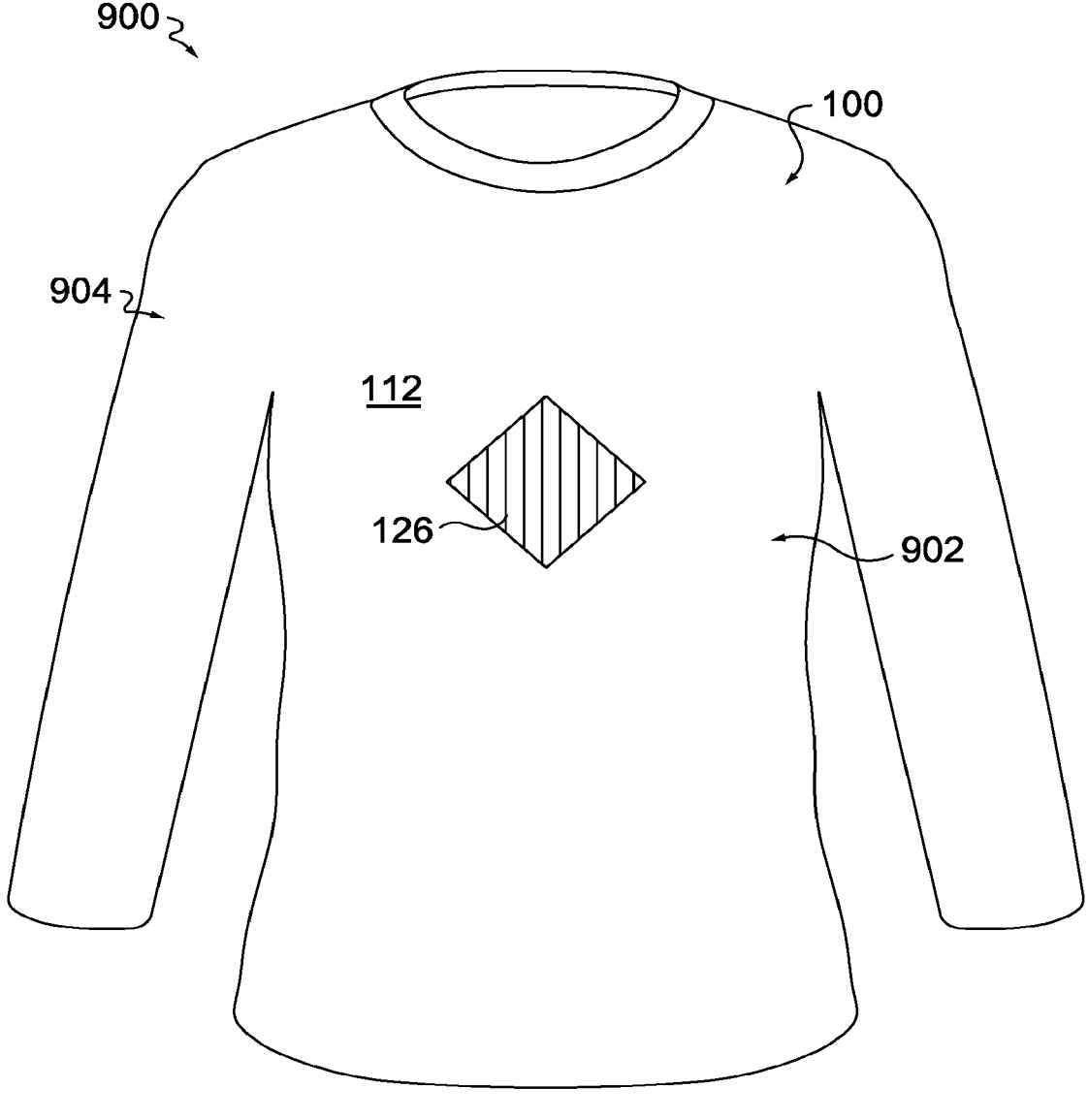
FIG. 9 illustrates a garment incorporating at least the first layer and the second layer of the multilayer textile of FIG. 1 in accordance with aspects herein.

A garment 900 is shown in FIG. 9 in accordance with aspects herein. The garment 900 is shown in the form of an upper-body garment (e.g., a long sleeve shirt), but it is contemplated herein that the garment 900 may be in the form of a lower-body garment, a whole body garment, and the like. Moreover, although shown in the form of a long sleeve shirt, it is contemplated herein that the garment 900 may take other forms such as a jacket, a pull-over, a hoodie, a shirt, and the like. Any and all aspects, and any variation thereof, are contemplated as being within aspects herein. In aspects, the garment 900 may be entirely formed from a multilayer textile such as the multilayer textile 100 with at least the first layer and the second layer described herein. Alternatively, one or more portions 904 of the garment 900 may be formed from one or more of the multilayer textiles with at least the first layer and the second layer described herein and other portions 902 of the garment 900 may be formed from other textile types (e.g., woven, non-woven, different knit constructions, and the like) that may have a single layer construction or a multilayer construction.

With respect to the garment 900, in aspects it is contemplated that the first layer 110 of the multilayer textile 100 may form an outermost layer of the garment 900 and that the first surface 112 of the first layer 110 may form an outer-facing surface of the garment 900. The second, third, and/or fourth layers 120, 130, 140 of the multilayer textile 100 may form inner layers and when the multilayer textile 100 includes only the first and second layers 110, 120, the fourth surface 124 of the second layer 120 forms an inner-facing surface of the garment 900 (not shown in FIG. 9). Similarly, when the multilayer textile 100 includes the third layer 130, the sixth surface 134 forms an inner-facing surface of the garment 900, and likewise, when the multilayer textile 100 includes the fourth layer 140, the eighth surface 144 forms an inner-facing surface of the garment 900. Continuing, as shown in FIG. 9 and in an aspect, the garment 900 comprises the sublimation-printed component 126, which is visible through the first layer 110, and thus, the sublimation-printed component 126 may be visible to an observer viewing the outer-facing surface of the garment 900. Any and all aspects, and any variation thereof, are contemplated as being within aspects herein.

Figure 10:
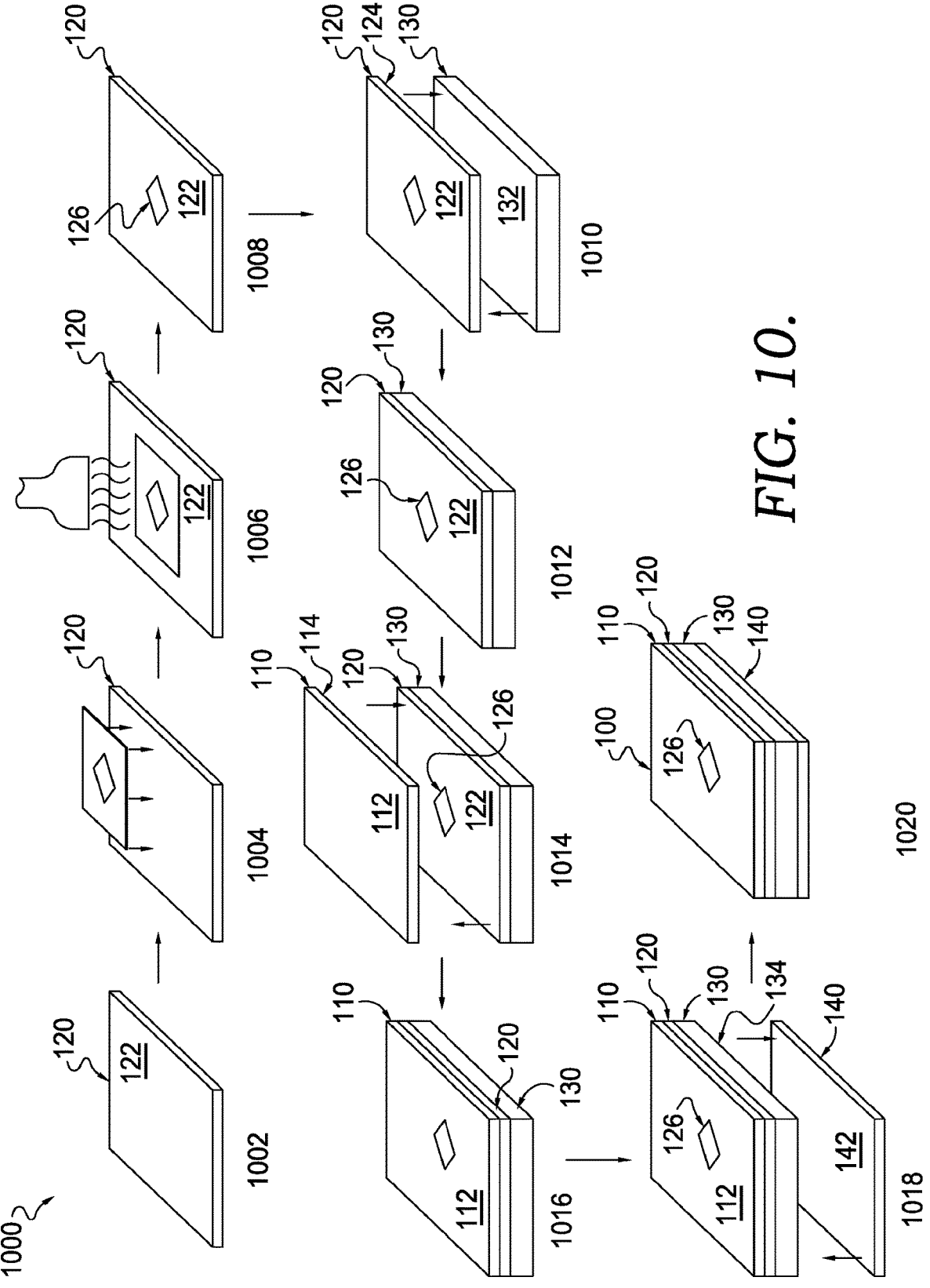
FIG. 10 illustrates a method of forming the multilayer textile of FIGS. 1-8 as described herein in accordance with aspects herein.

Turning now to FIG. 10, a method 1000 of forming the multilayer textile 100 is illustratively depicted. To simplify discussion, the method 1000 is described with general reference to aspects of the multilayer textile 100, as previously described in FIGS. 1-6. As shown, the method 1000 begins with a first step 1002 of providing a second layer 120 with a third surface 122 that may be formed from a non-woven material having a weight equal to or greater than about 35 GSM. In some aspects, the first step 1002 may further comprise applying a pre-treatment to the second layer 120. Next, at a second step 1004, 1006, 1008, the second layer 120 may be printed using a sublimation printing technique, which is depicted at a first sub-step 1004, a second sub-step 1006, and a third sub-step 1008. At the first sub-step 1004 one or more sublimation dyes are applied to the third surface 122 of the second layer 120 via a transfer sheet, and at the second sub-step 1006, at least heat and optionally pressure is applied to the second layer 120 and the transfer sheet. In aspects, the second sub-step 1006 may be performed at a temperature and for a duration that facilitates absorption, transfer, and/or retention of sublimation dyes and maintains a structural integrity of the second layer 120. Next, the transfer sheet is removed from the second layer 120 at the third sub-step 1008, and in some aspects, the second layer 120 may be washed and/or cured in the third sub-step 1008 after the transfer sheet has been removed from the second layer 120. After completion of the second step 1004, 1006, 1008 a sublimation-printed component 126 is formed on the second layer 120.

Continuing, a third step 1010 may include combining the second layer 120 with a third layer 130 with a fifth surface 132 that may be formed from a fiberfill material. The second and third layers 120, 130 may be combined such that the fifth surface 132 of the third layer 130 is positioned adjacent to a fourth surface 124 of the second layer 120, where the fourth surface 124 is positioned opposite the third surface 122. Next, an optional fourth step 1012 may include joining the second and third layers 120, 130 using a form of coupling in accordance with aspects herein. At a fifth step 1014, the second and third layers 120, 130 may be combined with a first layer 110 formed from a non-woven material that may have a weight ranging from about 40 GSM to about 75 GSM and may be formed of one or more multifilament and/or monofilament yarns having a denier ranging from about 7 denier to about 40 denier. Moreover, the first layer 110 may have a first surface 112 and an opposite second surface 114, and in aspects the first layer 110 is at least partially translucent. Further, the second and third layers 120, 130 may be combined with the first layer 110 such that the third surface 122 of the second layer 120 is positioned adjacent to the second surface 114 of the first layer. At an optional sixth step 1016, any of the first, second, and third layers 110, 120, 130 may be joined to one or more of the other layers using a form of coupling in accordance with aspects herein.

Continuing still, a seventh step 1018 may include combining the first, second, and third layers 110, 120, 130 with a fourth layer 140 with a seventh surface 142 that may be formed of a woven material that may be similar to and/or comprise one or more features of the first layer 110. The first, second, and third layers 110, 120, 130 may be combined with the fourth layer 140 such that the seventh surface 142 of the fourth layer 140 is positioned adjacent to a sixth surface 134 of the third layer 130, where the sixth surface is positioned opposite the fifth surface 132. Lastly, at an optional eighth step 1020, any of the first, second, third, and fourth layers 110, 120, 130, 140 may be joined to one or more other layers using a form of coupling in accordance with aspects herein, and upon completion of either the seventh or eighth steps 1018, 1020, the multilayer textile 100 is formed.

In aspects, one or more steps of the method 1000 may or may not be performed, performed in a different order, and/or repeated to form a multilayer textile 100 with a different amount of layers and/or different combinations of layers. For instance, the first, second, fifth, and sixth steps 1002, 1004, 1006, 1008, 1014, 1016 may be performed and the third, fourth, seventh, and eighth steps 1010, 1012, 1018, 1020 may not be performed to form the multilayer textile with the first layer 110 and the second layer 120. In another instance, the seventh and eighth steps 1018, 1020 may not be performed and all of the other steps may be performed to form the multilayer textile with the first, second, and third layers 110, 120, 130.

The method may further comprise incorporating the multilayer textile into a garment. In this aspect, the multilayer textile is incorporated into a garment such that the first layer 110 of the multilayer textile 100 may form an outermost layer of the garment and the first surface 112 of the first layer 110 may form an outer-facing surface of the garment. As such, the sublimation-printed component 126 is visible through the first layer 110 or outermost layer of the garment, and thus, the sublimation-printed component 126 may be visible to an observer viewing the outer-facing surface of the garment.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

20

What is claimed is:
1. A garment comprising:
a multilayer textile that forms one or more portions of the garment, the multilayer textile comprising:
a first layer comprising a woven material comprising one or more yarns, the first layer comprising a first surface and an opposite second surface, the one or more yarns comprising a visual component that imparts translucency to the first layer;
a second layer comprising a non-woven material having a weight from about 33 grams per square inch (GSM) to about 47 GSM, the second layer comprising a third surface and an opposite fourth surface, the third surface positioned adjacent to the second surface of the first layer, the second layer comprising a sublimation-printed component formed by one or more sublimation dyes applied to the third surface; and
a third layer formed from a fiberfill material, the third layer having a fifth surface and an opposite sixth surface, the fifth surface positioned adjacent to the fourth surface of the second layer,
wherein the first layer is laminated with the second layer,
wherein the first surface of the first layer forms an outer-facing surface of the garment, and
wherein, when the outer-facing surface of the garment is viewed, the sublimation-printed component is visible.
2. The garment of claim 1, wherein the second layer comprises a foil-printed component.
3. The garment of claim 1, wherein the visual component includes a material that forms the one or more yarns, wherein the material is configured to interact with light such that the sublimation-printed component of the second layer is at least partially visible through the one or more yarns of the woven material that forms the first layer.
4. The garment of claim 1, wherein the second layer comprises one or more films coupled to the third surface, the one or more films comprising one or more printed components and at least partially overlaying the sublimation-printed component, and the first layer and the second layer being laminated with each other through the one or more films.
5. The garment of claim 4, wherein the one or more films comprises a first film and a second film, the first film overlaying a first portion of the third surface and the second film overlaying a second portion of the third surface.
6. The garment of claim 5, wherein the first film and the second film, in combination with each other, form at least one of an image, a graphic, a design, or a visual indicia.
7. The garment of claim 1, wherein an entirety of the second surface of the first layer, which is positioned adjacent to the third surface of the second layer, is coupled, by lamination, directly to the second layer.
8. A garment comprising:
a multilayer textile comprising:
a first layer comprising a woven material comprising one or more yarns, the first layer comprising a first surface and an opposite second surface, the one or more yarns comprising a visual component configured to impart translucency to the first layer;
a second layer comprising a non-woven material, the second layer comprising a third surface and an opposite fourth surface, the third surface positioned adjacent to the second surface of the first layer, the second layer comprising a sublimation-printed component, wherein the second layer further comprises one or more films laminated to the third surface and the second surface, and wherein the sublimation-printed component is formed by one or more sublimation dyes applied to the third surface; and a third layer comprising a fiberfill material, the third layer comprising a fifth surface and an opposite sixth surface, the fifth surface positioned adjacent to the fourth surface of the second layer, wherein, when the outer-facing surface of the garment is viewed, the sublimation-printed component is viewed.

9. The garment of claim 8, wherein the visual component of the one or more yarns includes a clear material, wherein the clear material forms the one or more yarns, and wherein the sublimation-printed component of the second layer is at least partially visible through the one or more yarns of the woven material that forms the first layer.

10. The garment of claim 8, wherein the one or more yarns of the woven material comprise one or more multifilament yarns, the one or more multifilament yarns comprising a multifilament yarn composition, the multifilament yarn composition comprising a first polymer, wherein the first polymer is a terephthalate polymer.

11. The garment of claim 8, wherein the one or more yarns of the woven material comprise one or more multifilament yarns having a denier ranging from about 10 denier to about 15 denier.

12. The garment of claim 8, wherein the non-woven material of the second layer has a weight from about 33 grams per square inch (GSM) to about 47 GSM.

13. The garment of claim 12, wherein the non-woven material of the second layer comprises a plurality of fibers, each of the plurality of fibers comprising a fiber composition, the fiber composition comprising a polymer, wherein the polymer is a terephthalate polymer.

14. The garment of claim 13, wherein the plurality of fibers of the non-woven material of the second layer are entangled, wherein the fiberfill material of the third layer comprises multiple synthetic fibers, the multiple synthetic fibers of the fiberfill material being entangled, and wherein the multiple synthetic fibers of the fiberfill material are entangled to a lesser extent than the plurality of fibers of the non-woven material.

15. The garment of claim 14 further comprising a fourth layer, the fourth layer comprising a seventh surface and an opposite eighth surface, the seventh surface positioned adjacent to the sixth surface of the third layer.

16. A garment comprising:

a multilayer textile comprising:

a first layer comprising a first woven material having a weight ranging from about 40 grams per square meter (GSM) to about 75 GSM, the first woven material comprising one or more multifilament yarns having a denier ranging from about 10 denier to about 15 denier, the one or more multifilament yarns including a clear material, the first layer having a first surface, an opposite second surface, and a first edge;

a second layer comprising a non-woven material having a weight from about 33 GSM to about 47 GSM, the non-woven material comprising a plurality of fibers that are entangled, the second layer having a third surface and an opposite fourth surface, the third surface positioned adjacent to the second surface of the first layer, the second layer having a sublimation-printed component formed by one or more sublimation dyes applied to the third surface, the sublimation-printed component located on at least a portion of the third surface, wherein the second layer further comprises one or more films coupled to the third surface, the one or more films comprising one or more visual components and at least partially overlaying the sublimation-printed component, and wherein the first layer is joined to the second layer such that a position of the first layer relative to the second layer is maintained;

a third layer formed from a fiberfill material having insulating properties, the fiberfill material formed from multiple synthetic fibers that are entangled to a lesser extent than the plurality of fibers of the non-woven material, the third layer having a fifth surface and an opposite sixth surface, the fifth surface positioned adjacent to the fourth surface of the second layer;

a fourth layer formed from a second woven material, the fourth layer having a seventh surface, an opposite eighth surface, and a second edge, the seventh surface positioned adjacent to the sixth surface of the third layer; and a plurality of attachments that join the first layer and the fourth layer proximate the first edge of the first layer and the second edge of the fourth layer, wherein the first layer overlays an entirety of the third surface of the second layer and forms an outer-facing surface of the garment, wherein, when the garment is in an as-worn configuration, the sublimation-printed component of the second layer is at least partially visible at the outer-facing surface of the garment and the third layer at least partially retains body heat generated by a wearer.

17. The garment of claim 16, wherein the one or more sublimation dyes are at least partially absorbed by the non-woven material of the second layer.

18. The garment of claim 16, wherein the one or more multifilament yarns of the first woven material comprises a multifilament yarn composition, the multifilament yarn composition comprising a polyamide, wherein the polyamide is a long-chain synthetic polyamide.

19. The garment of claim 16, wherein the one or more films comprises a first film and a second film, the first film overlaying a first portion of the third surface and the second film overlaying a second portion of the third surface.

* * * * *